US011621656B2

(12) United States Patent
Tang et al.

(10) Patent No.: US 11,621,656 B2
(45) Date of Patent: *Apr. 4, 2023

(54) ELECTRIC MOTOR DRIVE SYSTEM FOR A VEHICLE

(71) Applicant: KARMA AUTOMOTIVE LLC, Irvine, CA (US)

(72) Inventors: Lixin Tang, Irvine, CA (US); Geng Niu, Irvine, MI (US)

(73) Assignee: Karma Automotive LLC, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/401,224

(22) Filed: Aug. 12, 2021

(65) Prior Publication Data
US 2021/0376776 A1    Dec. 2, 2021

Related U.S. Application Data

(63) Continuation of application No. 16/830,207, filed on Mar. 25, 2020, now Pat. No. 11,159,108.

(51) Int. Cl.
*H02P 5/74* (2006.01)
*H02M 7/5387* (2007.01)
*B60K 1/02* (2006.01)

(52) U.S. Cl.
CPC .............. *H02P 5/74* (2013.01); *B60K 1/02* (2013.01); *H02M 7/53871* (2013.01)

(58) Field of Classification Search
CPC ......... H02P 5/74; B60K 1/02; H02M 7/53871
See application file for complete search history.

(56) References Cited

U.S. PATENT DOCUMENTS

| | | | |
|---|---|---|---|
| 6,755,267 B2 | 6/2004 | Yamada et al. | |
| 8,890,455 B2 | 11/2014 | Toda et al. | |
| 2009/0033251 A1 | 2/2009 | Perisic et al. | |
| 2010/0013438 A1* | 1/2010 | Anwar | B60L 55/00 180/65.29 |
| 2010/0025127 A1* | 2/2010 | Oyobe | B60L 53/22 180/65.21 |
| 2010/0033438 A1 | 2/2010 | Fu et al. | |
| 2011/0181222 A1 | 7/2011 | Nagase et al. | |

* cited by examiner

*Primary Examiner* — Rina I Duda
(74) *Attorney, Agent, or Firm* — Honigman LLP

(57) ABSTRACT

An electrical drive system for a vehicle. The system includes a plurality of electric propulsion motors and a plurality of corresponding inverter circuits. The system also includes an auxiliary motor for driving an auxiliary device located in the vehicle. The auxiliary motor is connected to the propulsion motors and is driven by the inverter circuits. The system does not include a separate inverter for driving the auxiliary motor.

4 Claims, 5 Drawing Sheets

US 11,621,656 B2

ELECTRIC MOTOR DRIVE SYSTEM FOR A VEHICLE

CROSS-REFERENCE TO RELATED APPLICATION

This application is a continuation of U.S. patent application Ser. No. 16/830,207 (filed Mar. 25, 2020). The foregoing application is incorporated by reference herein.

BACKGROUND

The present disclosure relates to a method of using at least one primary inverter to partially or completely replace the functionality of an auxiliary inverter, thereby reducing the hardware requirements for a motor drive system.

Electric vehicles employ auxiliary power systems (i.e., auxiliary drives) to provide power to auxiliary loads. These auxiliary power systems differ from the vehicle propulsion system which typically employs a traction drive inverter having a much higher power rating. The power rating of the auxiliary loads are typically less 10 kW. These auxiliary loads may include air compressors, cooling system oil/water pumps, and electric power steering systems. FIG. 1 shows a conventional auxiliary motor drive system 200 including an inverter. The inverter includes six power switches 220 and a DC bus capacitor 210. The system may also include a gate drive board and controller. The inverter may need active cooling in most cases and the inverter-related hardware adds weight/volume/cost to the system. The inverter provides power to auxiliary loads such as, for example, an electric motor 230.

It is desirable to find a means to meet the power requirements of auxiliary systems without the use of additional hardware.

SUMMARY

Disclosed herein is a method of using at least one primary or traction motor inverter to partially or completely replace the functionality of an auxiliary motor inverter, thereby reducing the hardware requirements for a motor drive system.

The disclosed system provides a different auxiliary drive circuit to eliminate the auxiliary inverter hardware requirements, totally or partially and includes unique control algorithms for all the affected circuits.

According to a disclosed embodiment an electrical drive system for a vehicle is disclosed. The system includes first, second and third electric propulsion motors for driving the vehicle, wherein each of the propulsion motors includes three primary phase wires, and wherein each of the propulsion motors include a neutral point between the three primary phase wires. The system also includes first, second and third inverter circuits, wherein each of the inverter circuits is controlled by a controller and is paired with one of the electric propulsion motors so that each inverter circuit provides a plurality of phase voltages to one of the propulsion motors across the plurality of primary phase wires in order to drive the propulsion motor. The system also includes a three phase auxiliary motor for driving an auxiliary device located in the vehicle wherein the auxiliary motor includes three auxiliary phase wires. One of three auxiliary phase wires is connected to the neutral point of the first propulsion motor, and a second one of the three auxiliary phase wires is connected to the neutral point of the second propulsion motor, and a third one of the three auxiliary phase wires is connected to the neutral point of the third propulsion motor. The controller for each of the inverter circuits is configured to generate a zero-sequence voltage at the neutral point and in the connected auxiliary phase wire to thereby create the phase voltage in the auxiliary phase wire required for driving the auxiliary motor.

According to another disclosed embodiment, an electrical drive system for a vehicle is disclosed. The system includes first, second and third electric propulsion motors for driving the vehicle, wherein each of the propulsion motors includes three primary phase wires, and wherein each of the propulsion motors include a neutral point between the three primary phase wires. The system further includes first, second and third inverter circuits, wherein each of the inverter circuits is controlled by a controller and is paired with one of the electric propulsion motors so that each inverter circuit provides a plurality of phase voltages to one of the propulsion motors across the plurality of primary phase wires in order to drive the propulsion motor. A two phase auxiliary motor for driving an auxiliary device is located in the vehicle. The auxiliary motor includes three auxiliary phase wires. One of two auxiliary phase wires is connected to the neutral point of the first propulsion motor, and a second one of the two auxiliary phase wires is connected to the neutral point of the second propulsion motor. A neutral point of the auxiliary motor is connected to the neutral point of the third propulsion motor. The controller for each of the inverter circuits for the first and second propulsion motors is configured to generate a zero-sequence voltage at the neutral point and in the connected auxiliary phase wire to thereby create the phase voltage in the auxiliary phase wire required for driving the two phase auxiliary motor.

According to yet another disclosed embodiment, an electrical drive system for a vehicle is disclosed. The system includes first and second electric propulsion motors for driving the vehicle, wherein each of the propulsion motors includes three primary phase wires, and wherein each of the propulsion motors include a neutral point between the three primary phase wires. The system also includes first and second inverter circuits, wherein each of the inverter circuits is controlled by a controller and is paired with one of the electric propulsion motors so that each inverter circuit provides a plurality of phase voltages to one of the propulsion motors across the plurality of primary phase wires in order to drive the propulsion motor. The first inverter circuit includes an additional inverter leg including a pair of switches, wherein the additional inverter leg is not connected to any of the plurality primary phase wires. The system includes three phase auxiliary motor for driving an auxiliary device located in the vehicle wherein the auxiliary motor includes three auxiliary phase wires. One of three auxiliary phase wires is connected to the neutral point of the first propulsion motor. A second one of the three auxiliary phase wires is connected to the neutral point of the second propulsion motor. A third one of the three auxiliary phase wires is connected to the additional inverter leg of the first inverter circuit. The controller for each of the two inverter circuits is configured to generate a zero-sequence voltage at the neutral point and in the connected auxiliary phase wire to thereby create the phase voltage in auxiliary phase wire required for driving the auxiliary motor, wherein the controller for the first inverter circuit is configured to generate a voltage in the additional inverter leg and in one of the auxiliary phase wires for driving the auxiliary motor.

According to still another disclosed embodiment, an electrical drive system for a vehicle is disclosed. The system includes first and second electric propulsion motors for driving the vehicle, wherein each of the propulsion motors includes three primary phase wires. Each of the propulsion motors include a neutral point between the three primary phase wires. The system further also includes first and second inverter circuits, wherein each of the inverter circuits is controlled by a controller and is paired with one of the electric propulsion motors so that each inverter circuit provides a plurality of phase voltages to one of the propulsion motors across the plurality of primary phase wires in order to drive the propulsion motor. The first inverter circuit includes an additional inverter leg including a pair of switches, wherein the additional inverter leg is not connected to any of the plurality primary phase wires. A two phase auxiliary motor is provided for driving an auxiliary device located in the vehicle wherein the auxiliary motor includes three auxiliary phase wires. One of two auxiliary phase wires is connected to the neutral point of the first propulsion motor, and a second one of the two auxiliary phase wires is connected to the additional inverter leg of the first inverter circuit. A neutral point of the auxiliary motor is connected to the neutral point of the second propulsion motor. The controller for first inverter circuit is configured to generate a zero-sequence voltage at the neutral point and in the connected auxiliary phase wire to thereby create the phase voltage in the connected auxiliary phase wire required for driving the auxiliary motor. The controller for the first inverter circuit is configured to generate a voltage in the additional inverter leg and in the connected auxiliary phase wire for driving the auxiliary motor.

Other aspects, features, and techniques will be apparent to one skilled in the relevant art in view of the following detailed description of the embodiments.

BRIEF DESCRIPTION OF THE DRAWINGS

The features, objects, and advantages of the disclosed embodiments will become more apparent from the detailed description set forth below when taken in conjunction with the drawings in which like reference characters identify correspondingly throughout and wherein.

DETAILED DESCRIPTION

One aspect of the disclosure is directed to a method of using at least one primary motor inverter to partially or completely replace the functionality of an auxiliary motor inverter, thereby reducing the hardware requirements for a motor drive system.

References throughout this document to "one embodiment," "certain embodiments," "an embodiment," or similar term mean that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation. For example, two or more of the innovative methods described herein may be combined in a single method, but the application is not limited to the specific exemplary combinations of methods that are described herein.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

The character "N" refers hereinafter to the last member of a set or the total count of members in a set. The character "X" refers hereinafter to a variable member of a set. The characters "A", "B", "C", etc. refer to a specific but otherwise undefined member of a set.

A detailed description of various embodiments is provided; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the disclosed embodiments.

Figure 2:
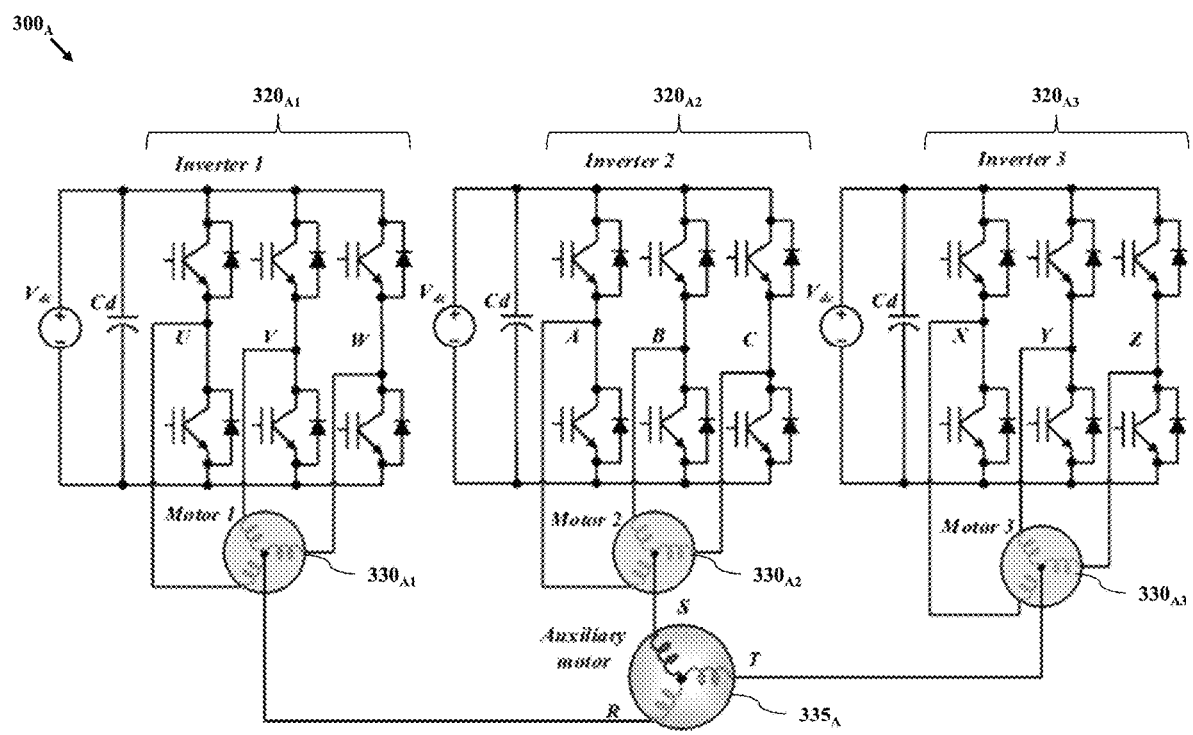
FIG. 2 is a circuit diagram of an exemplary embodiment of a multi-inverter drive system, wherein a plurality of primary inverters provide power for an auxiliary motor by using the zero-sequence voltage of a plurality of primary motors powered by the primary inverters.

FIG. 2 shows a power system for an electric vehicle. The system includes a circuit $300_A$, in which three (3) inverters $320_{A1-A3}$ are used to drive three star-connected motors $330_{A1-A3}$ in an electric vehicle. Each of the inverters is connected to the same or different DC bus (Vdc). The DC bus is supplied power by a battery, generator or other source of electrical power. The circuit $300_A$ may be employed in an electric vehicle that includes three inverters 320 in its powertrain for providing power to two or more propulsion motors 330. Each of these traction motors $330_{A1-A3}$ is driven by three phase voltages, wherein each phase voltage is carried across a phase wire. In one embodiment, each phase wire corresponds to a pair of inverter switches, wherein the activity of the pair of inverter switches provides a voltage signal/phase voltage to the phase wire, and the phase voltage in turn drives the operation of the motor.

In the main motors 330, power is transmitted by magnetic flux passing through an air gap, which has a very low magnetic permeability, which can limit performance of the motor. The configuration shown in FIG. 2 allows for the voltage of the phase wires of an auxiliary motor 335 to be driven by a zero-sequence voltage of the main motors. This configuration avoids using additional inverter leg, thus saves cost/weight/volume of the auxiliary inverter.

In one embodiment, shown in FIG. 2, at least one phase wire of the auxiliary motor $335_A$ is driven by a zero-sequence voltage of a main (e.g., a traction) motor $330_A$ instead of a pair of inverter switches. As used in this application, the term "auxiliary motor" refers to a motor not used to directly propel the vehicle. The auxiliary motor is used to drive an auxiliary device located in the vehicle. The auxiliary device or load typically has a power rating of less than 10 kW. These devices may include air compressors, cooling system oil/water pumps, and electric power steering systems, each of which may include one or more auxiliary motors.

The zero-sequence voltage of a motor is the voltage of the motor between its neutral point and ground. The neutral point of the motor $330_A$ is the point within the motor $330_A$ at which the three phase wires meet. In one embodiment, shown in FIG. 2, the neutral points of the motors 1, 2, and 3 ($330_{A1-A3}$) are connected to phase wires R, S, and T (respectively) of the auxiliary motor $335_A$. Each of the motors is controlled by a controller. The controller for Motor 1 is configured to generate a zero-sequence voltage of $V_R$. The controller for Motor 2 is configured to generate a zero-sequence voltage of $V_S$. The controller for Motor 3 is configured to generate a zero-sequence voltage of $V_T$. Each of the motors may have a dedicated controller or a single controller may control one or more motors.

The three phase voltages of $V_R$, $V_S$, $V_T$ are provided to drive auxiliary motor $335_A$. The current of auxiliary motor phase R is shared equally among the three phase wires U, V and W of motor 1 $330_{A1}$, due to the same voltage and zero-sequence impedance of motor 1 $330_{A1}$. This configuration will not generate any air-gap flux linkage in motor 1 $330_{A1}$ and, as a result, will not affect the torque generation of motor 1 $330_{A1}$. In the same manner as described above for the phase R of the auxiliary motor $335_A$, the current in phase S of the auxiliary motor is share equally among the three phase wires A, B and C of motor 2 $330_{A2}$, due to the same voltage and zero-sequence impedance of motor 2 $330_{A2}$. This configuration will not generate any air-gap flux linkage in motor 2 $330_{A1}$ and, as a result, will not affect the torque generation of motor 2 $330_{A2}$. Similarly, the current in phase T of the auxiliary motor is share equally among the three phase wires X, Y and Z of motor 3 $330_{A3}$, due to the same voltage and zero-sequence impedance of motor 3 $330_{A3}$. This configuration will not generate any air-gap flux linkage in motor 3 $330_{A3}$ and, as a result, will not affect the torque generation of motor 3 $330_{A3}$.

Figure 3:
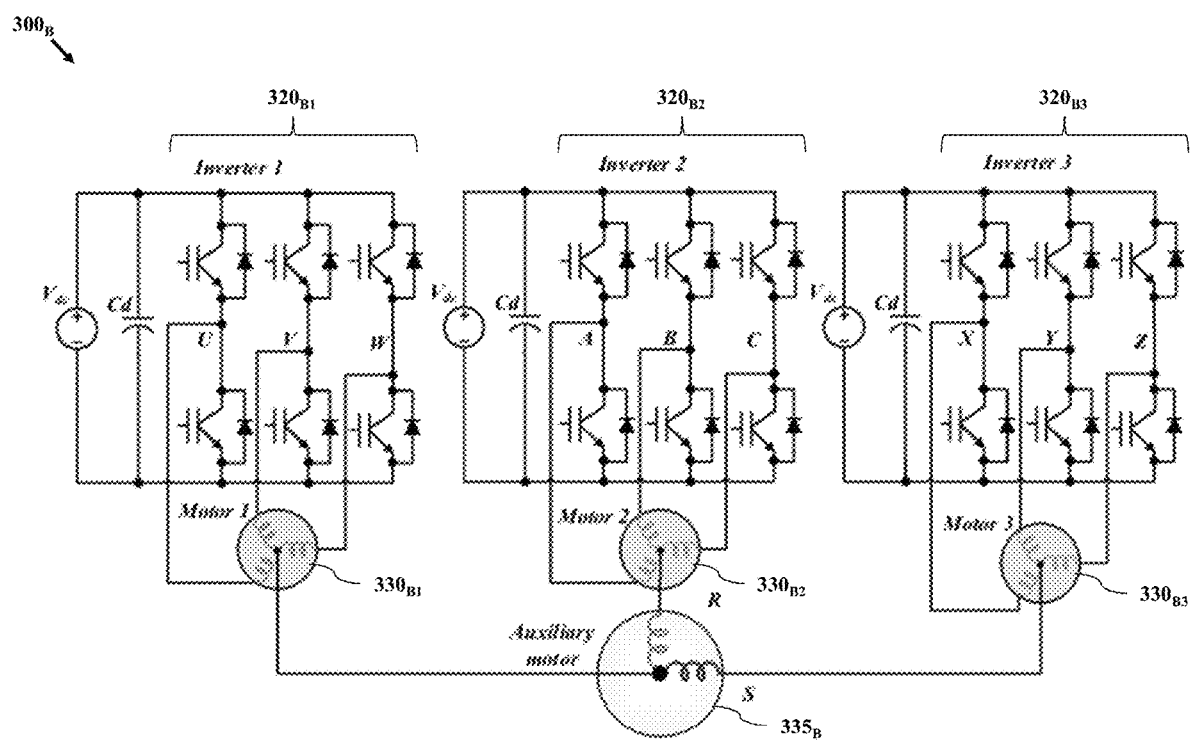
FIG. 3 is a circuit diagram of an exemplary embodiment of a multi-inverter drive system, wherein a plurality of primary inverters provide power for an auxiliary motor by using the zero-sequence voltage of a plurality of primary motors powered by the primary inverters.

FIG. 3 shows the proposed circuit B $300_B$. The circuit includes three inverters 320. The inverters 320 and motors 330 may be the same or similar to the inverters and motors described above. In one embodiment, the neutral point of motor 1 $330_{B1}$ is connected to the neutral point of a two-phase auxiliary motor $335_B$, while the neutral point of motor 2 $330_{B2}$ is connected to phase wire R and the neutral point of motor 3 $330_{B3}$ is connected to phase wire S.

The controller for Motor 1 is configured to generate a zero-sequence voltage of 0. The controller for Motor 2 is configured to generate a zero-sequence voltage of $V_R$. The controller for Motor 3 is configured to generate a zero-sequence voltage of $V_S$. The voltages ($V_R$, $V_S$) drive the rotation of the auxiliary motor $335_B$.

Figure 4:
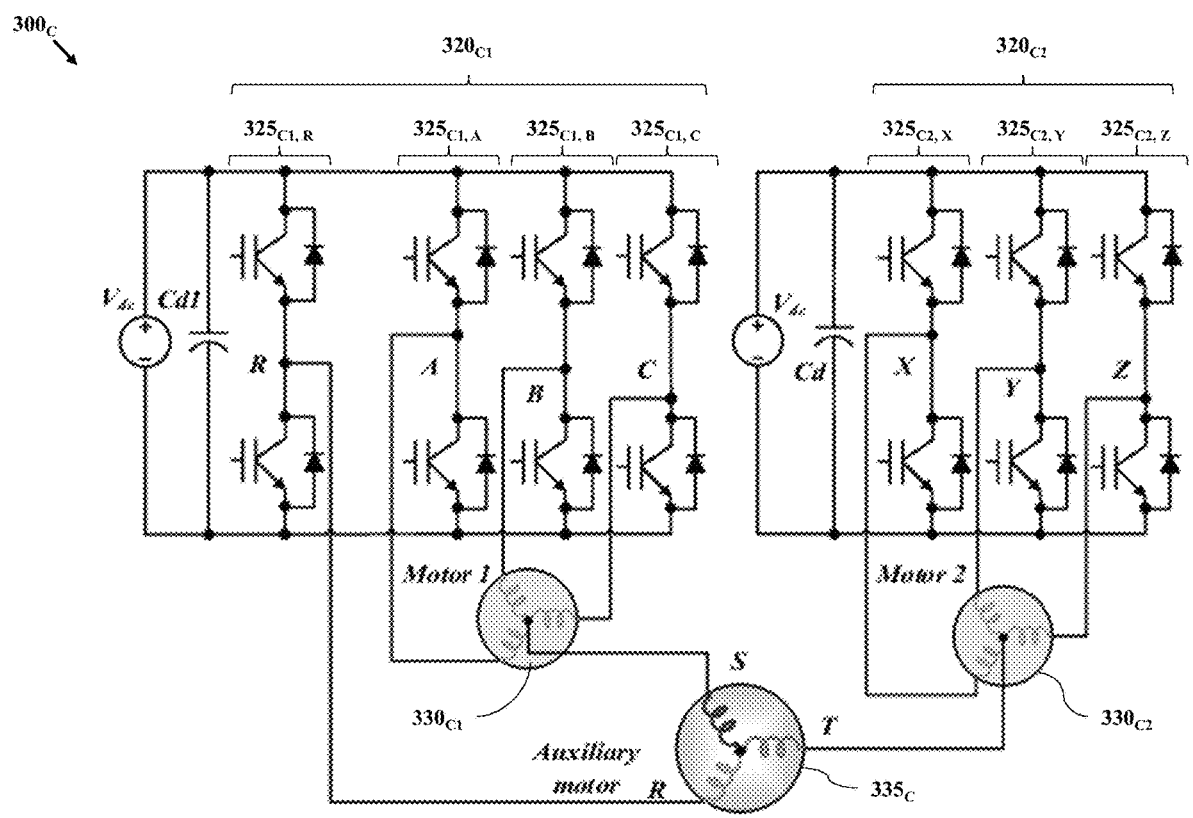
FIG. 4 is a circuit diagram of an exemplary embodiment of a multi-inverter drive system, wherein a plurality of primary inverters provide power for an auxiliary motor by using the zero-sequence voltage of a plurality of primary motors powered by the primary inverters, in conjunction with a dedicated inverter leg.

FIG. 4 shows proposed circuit C $300_C$, in which two inverters $320_{C1-C2}$ and their corresponding main propulsion motors $330_{C1-C2}$ are configured to drive a three-phase auxiliary motor $335_C$. The inverters 320 and motors 330 may be the same or similar to the inverters and motors described above. One of the inverters $320_{C1}$ may include an additional inverter leg. The additional inverter leg $325_{C1, R}$ is connected to the phase wire R of the auxiliary motor $335_C$, while the neutral point of motor 1 $330_{C1}$ is connected to phase wire S and the neutral point of motor 2 $330_{C2}$ is connected to phase wire T. The controller for Motor 1 is configured to generate a zero-sequence voltage $V_S$ in the phase winding S of the auxiliary motor $335_C$. The controller for Motor 2 is configured to generate a zero-sequence voltage of $V_T$ in the phase winding T of the auxiliary motor $335_C$.

Figure 5:
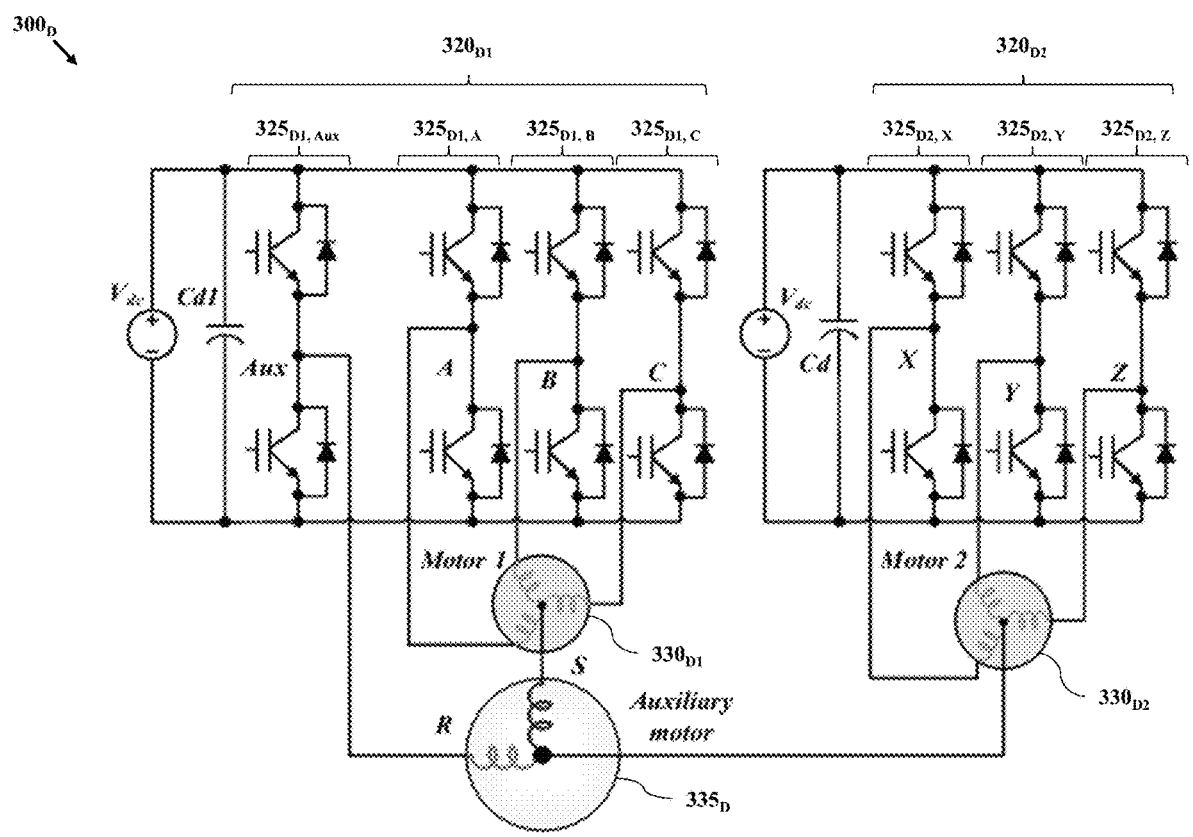
FIG. 5 is a circuit diagram of an exemplary embodiment of a multi-inverter drive system, wherein a plurality of primary inverters provide power for an auxiliary motor by using the zero-sequence voltage of a plurality of primary motors powered by the primary inverters, in conjunction with a dedicated inverter leg.

FIG. 5 shows proposed circuit D $300_D$, in which a two-phase auxiliary motor $335_D$ is driven by two inverters configured to drive the main propulsion motors. One of the inverters may include an additional inverter leg. The additional inverter leg $325_{D1, Aux}$ is connected to the phase wire R of the auxiliary motor $335_D$. The neutral point of motor 1 $330_{D1}$ is connected to phase wire S. The controller for Motor 1 is configured to generate a zero-sequence voltage of $V_S$ in the phase winding or wire S. The neutral point of motor 2 $330_{D2}$ is connected to the neutral point of the auxiliary motor $335_D$. The controller for Motor 2 is configured to generate a zero-sequence voltage of 0 is configured to generate a zero-sequence voltage of zero.

Figure 1:
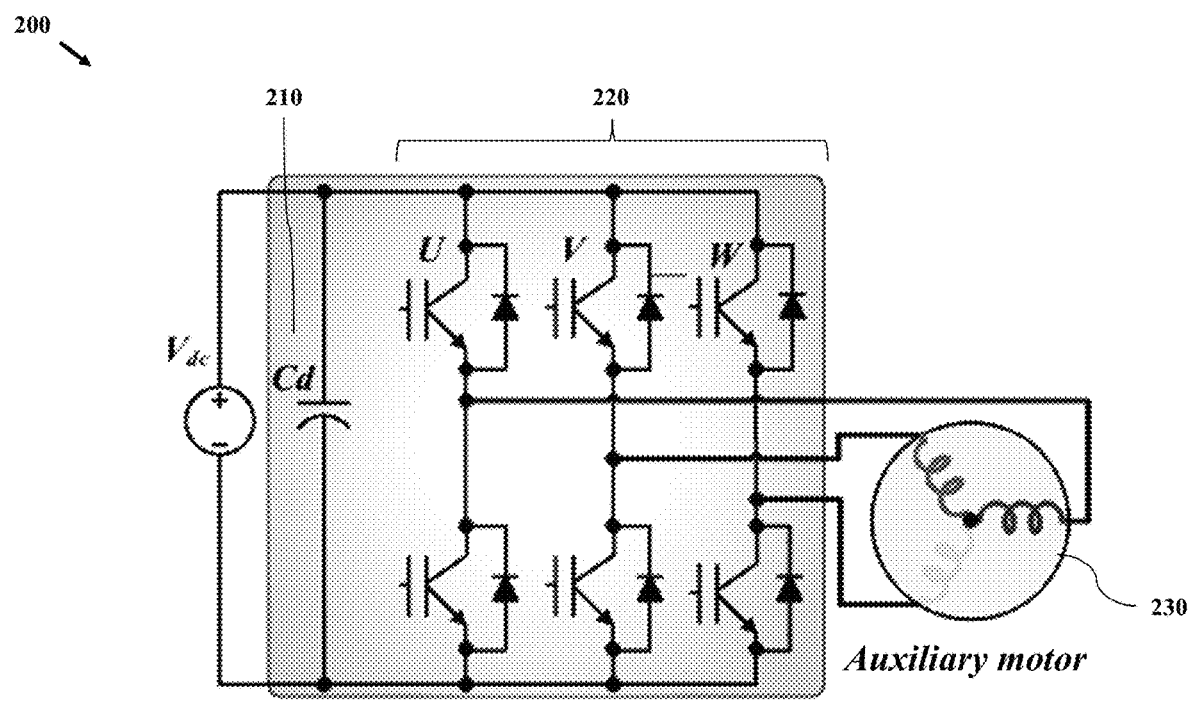
FIG. 1 is a circuit diagram of an exemplary embodiment of a previously established inverter for controlling an auxiliary motor.

The provision of the circuits A $300_A$ and B $300_B$, allows for the dedicated auxiliary inverter including all of the associated hardware (e.g., power switches, capacitor, gate drive board and micro-controller board) used in FIG. 1 can be replaced. In addition, the provision of the circuits C $300_C$ and D $300_D$, similarly allow for a portion of the auxiliary inverter to be eliminated. These two circuits include an auxiliary leg integrated into one or more of the main inverters driving the main propulsion motors.

The control methodology for the circuits A $300_A$ and B $300_B$ are described further below. The following definitions are provided for the associated voltages: for the auxiliary motor $335_A$ to reach desirable speed and generate reference torque, the auxiliary motor needs rotating voltage $u_{\alpha A}$ and $u_{\beta A}$ to be provided in the stationary reference frame; these voltages in the auxiliary motor require corresponding voltages in motor 1 of $u_{\alpha 1}$ and $u_{\beta 1}$ and voltages in motor 2 of $u_{\alpha 2}$ and $u_{\beta 2}$; for motor 3, it needs $u_{\alpha 3}$ and $u_{\beta 3}$.

For the auxiliary motor $335_A$, the phase R, S, and T voltages can be calculated as below in equation (1). In one embodiment, the power invariant Alpha-beta inverse transformation is used to find the necessary phase voltages to achieve the desired auxiliary motor rotating voltages and zero-sequence voltage.

$$\begin{bmatrix} u_R \\ u_S \\ u_T \end{bmatrix} = \sqrt{\frac{2}{3}} \begin{bmatrix} 1 & 0 & \frac{1}{\sqrt{2}} \\ -\frac{1}{2} & \frac{\sqrt{3}}{2} & \frac{1}{\sqrt{2}} \\ -\frac{1}{2} & -\frac{\sqrt{3}}{2} & \frac{1}{\sqrt{2}} \end{bmatrix} \begin{bmatrix} u_{\alpha A} \\ u_{\beta A} \\ 0 \end{bmatrix} \quad (1)$$

The voltage of inverter 1 $320_{A1}$ phases U, V, and W can be calculated as below in equation (2). In one embodiment, the zero-sequence voltage $u_R$ is generated from inverter 1 $320_{A1}$ for auxiliary motor $335_A$. In one embodiment, inverter 1 $320_{A1}$ does not only generate the positive-sequence voltage to drive motor 1 $330_{A1}$, it also generates the zero-sequence voltage for phase R of auxiliary motor $335_A$, wherein the auxiliary motor phase R current is shared equally among the three phase windings/wires of motor 1 $330_{A1}$ and the U, V, and W phases of the inverter 1 $320_{A1}$.

$$\begin{bmatrix} u_U \\ u_V \\ u_W \end{bmatrix} = \sqrt{\frac{2}{3}} \begin{bmatrix} 1 & 0 & \frac{1}{\sqrt{2}} \\ -\frac{1}{2} & \frac{\sqrt{3}}{2} & \frac{1}{\sqrt{2}} \\ -\frac{1}{2} & -\frac{\sqrt{3}}{2} & \frac{1}{\sqrt{2}} \end{bmatrix} \begin{bmatrix} u_{\alpha 1} \\ u_{\beta 1} \\ u_R \end{bmatrix} \quad (2)$$

Similarly, for inverter 2 $320_{A2}$, the phase A, B, and C voltages can be calculated as below in equation (3). In one embodiment, zero-sequence voltage $u_S$ is generated from inverter 2 $320_{A2}$ for auxiliary motor $335_A$.

$$\begin{bmatrix} u_A \\ u_B \\ u_C \end{bmatrix} = \sqrt{\frac{2}{3}} \begin{bmatrix} 1 & 0 & \frac{1}{\sqrt{2}} \\ -\frac{1}{2} & \frac{\sqrt{3}}{2} & \frac{1}{\sqrt{2}} \\ -\frac{1}{2} & -\frac{\sqrt{3}}{2} & \frac{1}{\sqrt{2}} \end{bmatrix} \begin{bmatrix} u_{\alpha 2} \\ u_{\beta 2} \\ u_S \end{bmatrix} \quad (3)$$

In inverter 3 $320_{A3}$, the phase X, Y, and Z voltages can be calculated as below in equation (4). Zero-sequence voltage $u_T$ is generated from inverter 3 $320_{A3}$ for auxiliary motor $335_A$.

$$\begin{bmatrix} u_X \\ u_Y \\ u_Z \end{bmatrix} = \sqrt{\frac{2}{3}} \begin{bmatrix} 1 & 0 & \frac{1}{\sqrt{2}} \\ -\frac{1}{2} & \frac{\sqrt{3}}{2} & \frac{1}{\sqrt{2}} \\ -\frac{1}{2} & -\frac{\sqrt{3}}{2} & \frac{1}{\sqrt{2}} \end{bmatrix} \begin{bmatrix} u_{\alpha 3} \\ u_{\beta 3} \\ u_T \end{bmatrix} \quad (4)$$

All the afore-mentioned equations indicate the control of the auxiliary motor $335_A$ via inverter 1~3 $320_{A1\text{-}A3}$. As mentioned above, the exemplary embodiments shown in FIGS. 2-5 allow for the dedicated inverter for the auxiliary motor to be eliminated.

The control algorithm for circuit B $300_B$ can be developed as described below. For example, the voltage of inverter 1 $320_{B1}$ phase U, V, and W can be calculated as below in equation (5). Zero-sequence voltage 0 is generated from inverter 1 $320_{B1}$ for auxiliary motor $335_B$. However, it has to take the total current of Phase R and S of the auxiliary motor $335_B$.

$$\begin{bmatrix} u_U \\ u_V \\ u_W \end{bmatrix} = \sqrt{\frac{2}{3}} \begin{bmatrix} 1 & 0 & \frac{1}{\sqrt{2}} \\ -\frac{1}{2} & \frac{\sqrt{3}}{2} & \frac{1}{\sqrt{2}} \\ -\frac{1}{2} & -\frac{\sqrt{3}}{2} & \frac{1}{\sqrt{2}} \end{bmatrix} \begin{bmatrix} u_{\alpha 1} \\ u_{\beta 1} \\ 0 \end{bmatrix} \quad (5)$$

In inverter 2 $320_{B2}$, the phase A, B, and C voltages can be calculated as below in equation (6). In one embodiment, the zero-sequence voltage $u_R$ is generated from inverter 2 $320_{B2}$ for auxiliary motor $335_B$. In one embodiment, inverter 2 $320_{B2}$ supplies the phase R current of the auxiliary motor $335_B$.

$$\begin{bmatrix} u_A \\ u_B \\ u_C \end{bmatrix} = \sqrt{\frac{2}{3}} \begin{bmatrix} 1 & 0 & \frac{1}{\sqrt{2}} \\ -\frac{1}{2} & \frac{\sqrt{3}}{2} & \frac{1}{\sqrt{2}} \\ -\frac{1}{2} & -\frac{\sqrt{3}}{2} & \frac{1}{\sqrt{2}} \end{bmatrix} \begin{bmatrix} u_{\alpha 2} \\ u_{\beta 2} \\ u_R \end{bmatrix} \quad (6)$$

In inverter 3 $320_{B3}$, the phase X, Y, and Z voltages can be calculated as below in equation (7). Zero-sequence voltage $u_S$ is generated from inverter 3 $320_{B3}$ for auxiliary motor $335_B$.

$$\begin{bmatrix} u_X \\ u_Y \\ u_Z \end{bmatrix} = \sqrt{\frac{2}{3}} \begin{bmatrix} 1 & 0 & \frac{1}{\sqrt{2}} \\ -\frac{1}{2} & \frac{\sqrt{3}}{2} & \frac{1}{\sqrt{2}} \\ -\frac{1}{2} & -\frac{\sqrt{3}}{2} & \frac{1}{\sqrt{2}} \end{bmatrix} \begin{bmatrix} u_{\alpha 3} \\ u_{\beta 3} \\ u_S \end{bmatrix} \quad (7)$$

Control laws for circuits C $300_C$ and D $300_D$ can be developed similarly.

While this disclosure makes reference to exemplary embodiments, it will be understood by those skilled in the art that various changes in form and details may be made therein without departing from the scope of the claimed embodiments.

What is claimed is:

1. An electrical drive system for a vehicle, comprising:
   first and second electric propulsion motors for driving the vehicle, wherein each of the propulsion motors includes three primary phase wires, and wherein each of the propulsion motors include a neutral point between the three primary phase wires;
   first and second inverter circuits, wherein each of the inverter circuits is controlled by a controller and is paired with one of the electric propulsion motors so that each inverter circuit provides a plurality of phase voltages to one of the propulsion motors across the plurality of primary phase wires in order to drive the propulsion motor;
   wherein the first inverter circuit includes an additional inverter leg including a pair of switches;
   a three phase auxiliary motor for driving an auxiliary device located in the vehicle, and wherein the auxiliary motor includes three auxiliary phase wires;
   wherein each of the three auxiliary phase wires is supplied with an auxiliary phase voltage provided by one of the inverter circuits;
   the controller for each of the inverter circuits is configured to generate a zero-sequence voltage at the neutral point of the propulsion motor being driving by the inverter circuit and in the auxiliary phase wire required for driving the auxiliary motor.

2. The electrical drive system of claim 1,
wherein one of the three auxiliary phase wires is connected to the neutral point of the first propulsion motor, a second one of the three auxiliary phase wires is connected to the neutral point of the second propulsion motor, and a third one of the three auxiliary phase wires is connected to the additional inverter leg of the first inverter circuit;
wherein the controller for each of the two inverter circuits is configured to generate a zero-sequence voltage at the neutral point of the propulsion motor being driven by the inverter circuit and in the connected auxiliary phase wire to thereby create the auxiliary phase voltage in auxiliary phase wire required for driving the auxiliary motor, wherein the controller for the first inverter circuit is configured to generate a voltage in the additional inverter leg and in one of the auxiliary phase wires for driving the auxiliary motor.

3. An electrical drive system for a vehicle, comprising:
first and second electric propulsion motors for driving the vehicle, wherein each of the propulsion motors includes three primary phase wires, and wherein each of the propulsion motors include a neutral point between the three primary phase wires;
first and second inverter circuits, wherein each of the inverter circuits is controlled by a controller and is paired with one of the electric propulsion motors so that each inverter circuit provides a plurality of phase voltages to one of the propulsion motors across the plurality of primary phase wires in order to drive the one of the propulsion motors;
the first inverter circuit includes an additional inverter leg including a pair of switches;
a two phase auxiliary motor for driving an auxiliary device located in the vehicle wherein the auxiliary motor includes two auxiliary phase wires;
wherein each of the two auxiliary phase wires is supplied with an auxiliary phase voltage by one of the inverter circuits;
the controller for each of the inverter circuits is configured to generate a zero-sequence voltage at the neutral point and in the auxiliary phase wire required for driving the auxiliary motor.

4. The electrical drive system of claim 3,
wherein one of two auxiliary phase wires is connected to the neutral point of the first propulsion motor, and a second one of the two auxiliary phase wires is connected to the additional inverter leg of the first inverter circuit;
wherein a neutral point of the auxiliary motor is connected to the neutral point of the second propulsion motor; and
wherein the controller for first inverter circuit is configured to generate a zero-sequence voltage at the neutral point and in the connected auxiliary phase wire to thereby create the auxiliary phase voltage in the connected auxiliary phase wire required for driving the auxiliary motor, wherein the controller for the first inverter circuit is configured to generate a voltage in the additional inverter leg and in the connected auxiliary phase wire for driving the auxiliary motor.

* * * * *